US012650512B2

(12) United States Patent
Yang et al.

(10) Patent No.: US 12,650,512 B2
(45) Date of Patent: Jun. 9, 2026

(54) APPARATUS FOR DETECTING DISTANCE AND METHOD THEREOF

(71) Applicants:Hyundai Motor Company, Seoul (KR); Kia Corporation, Seoul (KR); Pusan National University Industry-University Cooperation Foundation, Busan (KR)

(72) Inventors: Sang Hyeok Yang, Suwon-Si (KR); Hyun Soo Kim, Yongin-Si (KR); Tae Ho Jeong, Yongin-Si (KR); Jang Hyeon Lee, Gunpo-Si (KR); Chang Seok Kim, Busan (KR); Han Sol Jang, Busan (KR); Da Woon Jeong, Busan (KR)

(73) Assignees: Hyundai Motor Company, Seoul (KR); Kia Corporation, Seoul (KR); Pusan National University Industry-University, Busan (KR)

( * ) Notice: Subject to any disclaimer, the term of this patent is extended or adjusted under 35 U.S.C. 154(b) by 1037 days.

(21) Appl. No.: 17/835,755

(22) Filed: Jun. 8, 2022

(65) Prior Publication Data

US 2023/0184942 A1     Jun. 15, 2023

(30) Foreign Application Priority Data

Dec. 13, 2021    (KR) ......................... 10-2021-0178007

(51) Int. Cl.
*G01S 17/00*        (2020.01)
*G01S 17/34*        (2020.01)
(Continued)

(52) U.S. Cl.
CPC .............. *G01S 17/34* (2020.01); *G01S 17/48* (2013.01); *G01S 17/58* (2013.01)

(58) Field of Classification Search
USPC ........................................................ 356/5.09
See application file for complete search history.

(56) References Cited

U.S. PATENT DOCUMENTS

| | | | | | |
|---|---|---|---|---|---|
| 5,534,993 | A | * | 7/1996 | Ball | ......................... G01S 17/34 |
| | | | | | 356/5.15 |
| 9,078,052 | B2 | * | 7/2015 | Copner | .............. H04Q 11/0005 |

(Continued)

FOREIGN PATENT DOCUMENTS

| | | | | | |
|---|---|---|---|---|---|
| CN | 115128579 A | * | 9/2022 | ............. | G01S 7/481 |
| JP | H04163980 A | * | 6/1992 | | |

(Continued)

OTHER PUBLICATIONS

M. A. Ummy, N. Madamopoulos, M. Razani, A. Hossain and R. Dorsinville, "Characterization of dual wavelength SOA based fiber laser," 2012 International Conference on Fiber Optics and Photonics (Year: 2012).*

(Continued)

*Primary Examiner* — James R Hulka
(74) *Attorney, Agent, or Firm* — MORGAN, LEWIS & BOCKIUS LLP

(57) ABSTRACT

A distance detecting apparatus and a method thereof includes a dual wavelength tuning light source configured to transmit a transmission optical signal by performing band tunability and fine tunability on an optical signal based on non-mechanical scanning; a transmitter optical system configured to transmit the transmission optical signal received from the dual wavelength tuning light source to an outside: a receiver optical system configured to extract a wavelength difference between a reception optical signal received from the outside and the transmission optical signal received from the dual wavelength tuning light source; and a signal processor configured to receive the wavelength difference from (Continued)

the receiver optical system and convert the wavelength difference into distance information.

18 Claims, 15 Drawing Sheets

(51) Int. Cl.
    *G01S 17/48*           (2006.01)
    *G01S 17/58*           (2006.01)

(56)           References Cited

U.S. PATENT DOCUMENTS

| | | | |
|---|---|---|---|
| 11,994,628 B2 * | 5/2024 | Chong | G01S 17/32 |
| 2010/0265491 A1 * | 10/2010 | McDonald | G01S 17/10 |
| | | | 356/5.11 |
| 2014/0016933 A1 * | 1/2014 | Copner | H04Q 11/0005 |
| | | | 398/48 |

| | | | |
|---|---|---|---|
| 2015/0109614 A1 * | 4/2015 | De Oliveira Garcia Da Fonseca | G01N 33/553 |
| | | | 356/128 |
| 2021/0063549 A1 | 3/2021 | Chong | |
| 2021/0389424 A1 * | 12/2021 | Yeun | G01S 7/4811 |

FOREIGN PATENT DOCUMENTS

| | | | | |
|---|---|---|---|---|
| JP | 2013233936 A | * | 11/2013 | B41J 3/40733 |
| JP | 2018188234 A | * | 11/2018 | |
| WO | WO-2011023853 A2 | * | 3/2011 | G01B 11/0691 |

OTHER PUBLICATIONS

M. Pu et al., "Dual-Heterodyne Mixing Based Phase Noise Cancellation for Long Distance Dual-Wavelength FMCW Lidar," 2020 Optical Fiber Communications Conference and Exhibition (OFC), San Diego, CA, USA, (Year: 2020).*

Masayuki Okano and Changho Chong, "Swept Source Lidar: simultaneous FMCW ranging and nonmechanical beam steering with a wideband swept source," Opt. Express 28, 23898-23915 (2020).

* cited by examiner

FMCW : △0.01nm              200m             3~4mm

APPARATUS FOR DETECTING DISTANCE AND METHOD THEREOF

CROSS-REFERENCE TO RELATED APPLICATION

The present application claims priority to Korean Patent Application No. 10-2021-0178007, filed on Dec. 13, 2021, the entire contents of which is incorporated herein for all purposes by this reference.

BACKGROUND OF THE PRESENT DISCLOSURE

Field of the Present Disclosure

The present disclosure relates to a distance detecting apparatus and a method thereof, and more particularly, to an infrared mid-long-range wavelength tuning technique.

DESCRIPTION OF RELATED ART

A sensing technique using an optical source is being applied to various fields. Representatively, there are distance detection, gas detection, shape defection analysis, and transmission image acquisition.

Multi-wavelength light sources such as LEDs, high-power short-wavelength sources such as lasers, and LiDAR are used depending on a purpose of use.

In the case of LiDAR, a frequency modulated continuous wave (FMCW) technique that continuously changes the wavelength over time together with a time-of flight (ToF) method using short-wavelength laser pulses for distance detecting is applied.

Furthermore, a conventional distance sensor utilizes a mechanical scanning method to secure a detecting range. The present mechanical scanning method has a problem in that durability is weak due to weak vibration, so a non-mechanical scanning technique is being studied.

As described above, generally, because optical signals are transmitted and received while scanning is performed by use of the FMCW method for distance detecting, a position at which light is transmitted and a position at which the light is received may be different, and thus an error may occur in detecting the distance. That is, FMCW distance detection has to detect the distance from a single point that does not move by changing a wavelength for a certain time period, but because a scanning operation is performed at the same time, there is inevitably a problem that the point moves.

Furthermore, the larger the wavelength tuning range required for scanning is, the more advantageous it is to secure a wide angle of view, but the wavelength tuning range required for FMCW distance detection is rather small and finely adjustable, the more advantageous it is.

However, for tunability in a large range, it is difficult to adjust the wavelength in minute units, and it is difficult to extend the wavelength to a large range while performing fine adjustment.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a distance detecting apparatus and a method thereof, configured for minimizing an interference error between FMCW distance detection and non-mechanical scanning by applying band tunability and fine tunability together for frequency continuous modulation when non-mechanical scanning using a dual wavelength tuning optical signal is performed.

The technical objects of the present disclosure are not limited to the objects mentioned above, and other technical objects not mentioned may be clearly understood by those skilled in the art from the description of the claims.

Various aspects of the present disclosure are directed to providing a distance detecting apparatus including: a dual wavelength tuning light source configured to transmit a transmission optical signal by performing band tunability and fine tunability on an optical signal based on non-mechanical scanning; a transmitter optical system configured to transmit the transmission optical signal received from the dual wavelength tuning light source to an outside: a receiver optical system configured to extract a wavelength difference between a reception optical signal received from the outside thereof and the transmission optical signal received from the dual wavelength tuning light source; and a signal processor configured to receive the wavelength difference from the receiver optical system and convert the wavelength difference into distance information.

In an exemplary embodiment of the present disclosure, the dual wavelength tuning light source may detect a distance by performing the band tunability for moving a band tuning transmission direction of an optical signal by one point, and performing the fine tunability for finely tuning the optical signal in a stopped state at each moved point.

In an exemplary embodiment of the present disclosure, the dual wavelength tuning light source an optical amplification stage configured to amplify the optical signal; a fine tuning stage configured to electrically finely tuning a wavelength of the optical signal; and a band tuning stage configured to tune the wavelength of the optical signal at an interval that greater than a predetermined magnitude.

In an exemplary embodiment of the present disclosure, the transmitter optical system may include a non-mechanical scanning optical system.

In an exemplary embodiment of the present disclosure, the receiver optical system may include a frequency modulated continuous wave (FMCW) optical system.

In an exemplary embodiment of the present disclosure, the dual wavelength tuning light source may emit the optical signal by continuously finely tuning a frequency thereof at an initial scanning point, and may transmit the finely tuned optical signal to the receiver optical system.

In an exemplary embodiment of the present disclosure, the receiver optical system may receive the transmission optical signal which is reflected by an external target and returns.

In an exemplary embodiment of the present disclosure, the dual wavelength tuning light source, after the conversion into the distance information, may determine whether a current point is a last point.

In an exemplary embodiment of the present disclosure, the dual wavelength tuning light source may move one scanning point in a transmission direction of the optical signal from the current point through the band tunability when the current point is not the last point.

In an exemplary embodiment of the present disclosure, the dual wavelength tuning light source may perform the fine tunability on the optical signal at the moved point to transmit it to the receiver optical system.

In an exemplary embodiment of the present disclosure, the receiver optical system may extract the wavelength difference by allowing the transmission optical signal and the reception optical signal to interfere with each other.

In an exemplary embodiment of the present disclosure, the receiver optical system may allow the transmission optical signal and the reception optical signal to interfere with each other by use of at least one of an optical fiber, an optical coupler, ora reflective mirror.

Various aspects of the present disclosure are directed to providing a distance detecting method including: performing band tunability and fine tunability on an optical signal based on non-mechanical scanning; transmitting a transmission optical signal which is subjected to the band tunability and the fine tunability; receiving the transmission optical signal which is reflected by an external target and returns; and obtaining distance information by extracting a wavelength difference between the reception optical signal and the transmission optical signal.

In an exemplary embodiment of the present disclosure, the performing of the band tunability and the fine tunability on the optical signal may include detecting a distance by moving a band tuning transmission direction of an optical signal by one point, and finely tuning the optical signal in a stopped state at the moved point.

In an exemplary embodiment of the present disclosure, the transmitting of the transmission optical signal to the outside may include transmitting the transmission optical signal to an outside through a non-mechanical scanning optical system.

In an exemplary embodiment of the present disclosure, the receiving of the signal may include receiving the signal through a frequency modulated continuous wave (FMCW) optical system.

In an exemplary embodiment of the present disclosure, the performing of the band tunability and the fine tunability on the optical signal may include emitting the optical signal by continuously finely tuning a frequency thereof at an initial scanning point, and transmitting the finely tuned optical signal to the FMCW optical system.

In an exemplary embodiment of the present disclosure, the obtaining of the distance information may include: extracting the wavelength difference by allowing the transmission optical signal and the reception optical signal to interfere with each other; and converting the wavelength difference into the distance information.

In an exemplary embodiment of the present disclosure, it may further include, after obtaining the distance information, determining whether a current point is a last point.

In an exemplary embodiment of the present disclosure, it may further include moving one scanning point in a transmission direction of the optical signal from the current point through the band tunability when the current point is not the last point.

Accordingly, it is possible to minimize an interference error between FMCW distance detection and non-mechanical scanning by applying band tunability and fine tunability together for frequency continuous modulation when non-mechanical scanning using a dual wavelength tuning optical signal is performed.

Furthermore, various effects which may be directly or indirectly identified through the present specification may be provided.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
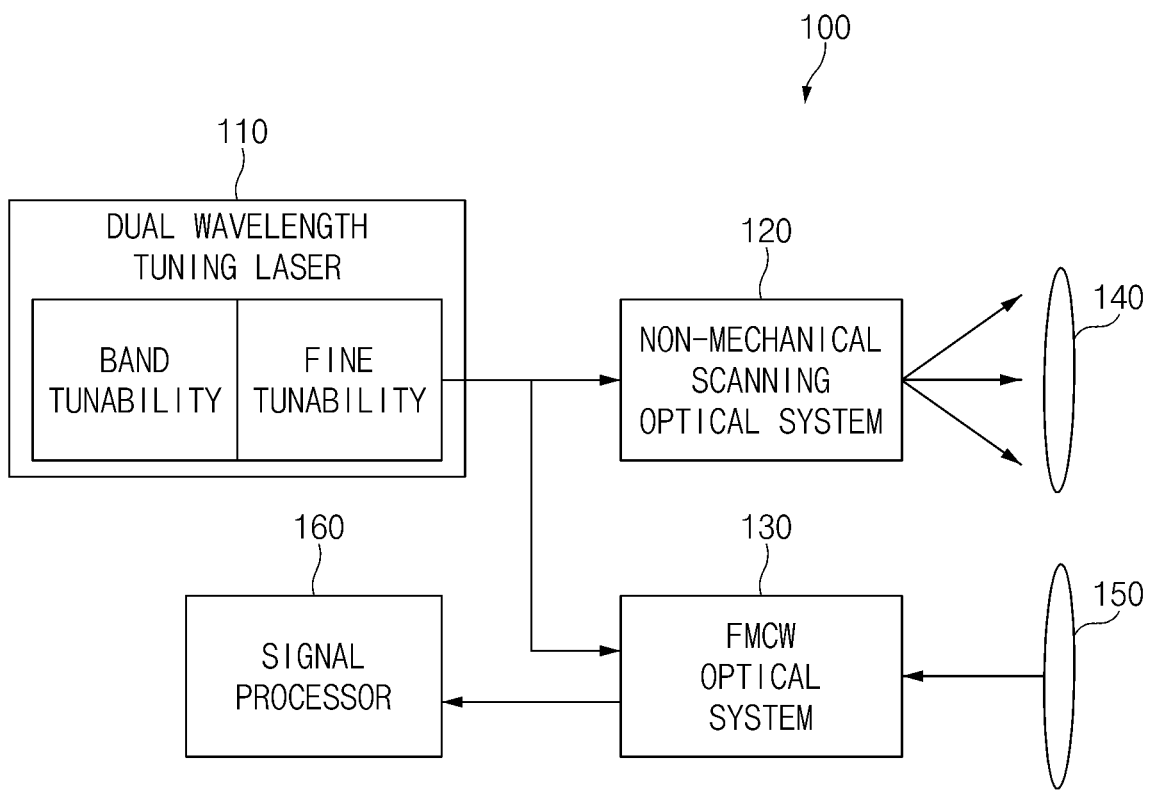
FIG. 1 illustrates schematic diagram showing a distance detecting apparatus according to various exemplary embodiments of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, some exemplary embodiments of the present disclosure will be described in detail with reference to exemplary drawings. It should be noted that in adding reference numerals to constituent elements of each drawing, the same constituent elements have the same reference numerals as possible even though they are indicated on different drawings. Furthermore, in describing exemplary embodiments of the present disclosure, when it is determined that detailed descriptions of related well-known configurations or functions interfere with understanding of the exemplary embodiments of the present disclosure, the detailed descriptions thereof will be omitted.

In describing constituent elements according to various exemplary embodiments of the present disclosure, terms such as first, second, A, B, (a), and (b) may be used. These terms are only for distinguishing the constituent elements from other constituent elements, and the nature, sequences, or orders of the constituent elements are not limited by the terms. Furthermore, all terms used herein including technical scientific terms have the same meanings as those which are generally understood by those skilled in the technical field of the present disclosure to which an exemplary embodiment of the present disclosure pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

Hereinafter, various exemplary embodiments of the present disclosure will be described in detail with reference to FIG. 1 to FIG. 12.

Figure 2:
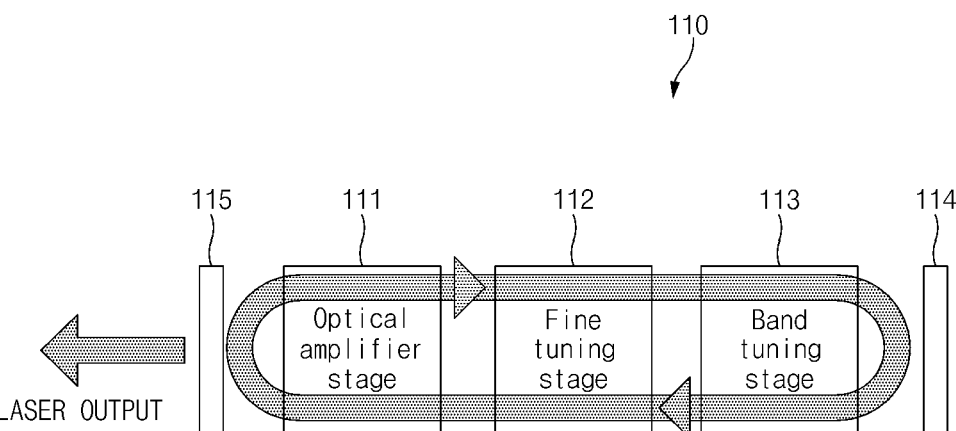
FIG. 2 illustrates a detailed schematic diagram showing a dual wavelength tuning laser of a distance detecting apparatus according to various exemplary embodiments of the present disclosure.

FIG. 1 illustrates schematic diagram showing a distance detecting apparatus according to various exemplary embodiments of the present disclosure, and FIG. 2 illustrates a detailed schematic diagram showing a dual wavelength tuning laser of a distance detecting apparatus according to various exemplary embodiments of the present disclosure.

The distance detecting apparatus 100 may perform non-mechanical scanning by use of both of a band variable for controlling wavelength tuning of an optical signal in a large range which is greater than a predetermined magnitude and a fine variable for finely tuning a wavelength of the optical signal.

The distance detecting apparatus 100 may process a signal transmitted between each internal component. The distance detecting apparatus 100 may be implemented in a form of hardware, software, or a combination of hardware and software. For example, the distance detecting apparatus 100 may be implemented as a microprocessor, but the present disclosure is not limited thereto.

Referring to FIG. 1, the distance detecting apparatus 100 may include a dual wavelength tuning laser 110, a non-mechanical scanning optical system (transmitter optical system) 120, a frequency modulated continuous wave (FMCW) optical system (receiver optical system) 130, a transmitting lens 140, a receiving lens 150, and a signal processor 160.

The dual wavelength tuning laser 11, which is a dual wavelength tuning light source, may transmit a transmission optical signal by performing band tunability and fine tunability on an optical signal based on non-mechanical scanning.

Referring to FIG. 2, the dual wavelength tuning laser 110 includes an optical amplifier stage 111 for generating and amplifying a first optical signal, a fine tuning stage 112 for finely tuning the optically amplified signal, a band tuning stage 113 for band-tuning the finely tuned signal, and a pair of reflective mirrors (low reflective mirror 116 and high reflective mirror 115) for optical resonance depending on a laser generation principle. In the instant case, positions or orders of the fine tuning stage 112 and the band tuning stage 113 may be interchanged.

The non-mechanical scanning optical system 120 receives the optical signal generated by the dual wavelength tuning laser 110 and transmits it to the outside through the transmitting lens 140. In the instant case, a transmission direction may be changed depending on the tuned wavelength, and a combination of various lenses for widening an angle of view may be implemented.

The FMCW optical system 130 may detect a difference between an external signal received by being reflected through the receiving lens 150 and the optical signal for transmission generated by the dual wavelength tuning laser 110, to extract a difference in wavelength by interfering with the two optical signals. In the instant case, optical interference may be implemented by combining an optical fiber, an optical coupler, a reflective mirror, and the like.

The signal processor 160 may convert the difference in wavelength received from the FMCW optical system 130 into distance information (including direction information) to output it.

Accordingly, the present disclosure applies the dual wavelength tuning laser in two ways: a band tuning function for securing a large tuning range, and a fine tuning function required for FMCW distance detection. In the instant case, various wavelength tuning methods such as mechanical, non-mechanical, etc. are applicable to the band tuning function. However, for a method for fine tuning required for FMCW distance detection, a non-mechanical method must be applied to ensure fine adjustment and linearity.

Herein, an all-optical modulator may be applied for fine adjustment, and other non-mechanical wavelength tuning methods may also be applied. Accordingly, it is possible to apply non-mechanical wavelength tuning methods which may be controlled by an electric signal other than an electro-optical modulator.

Figure 3:
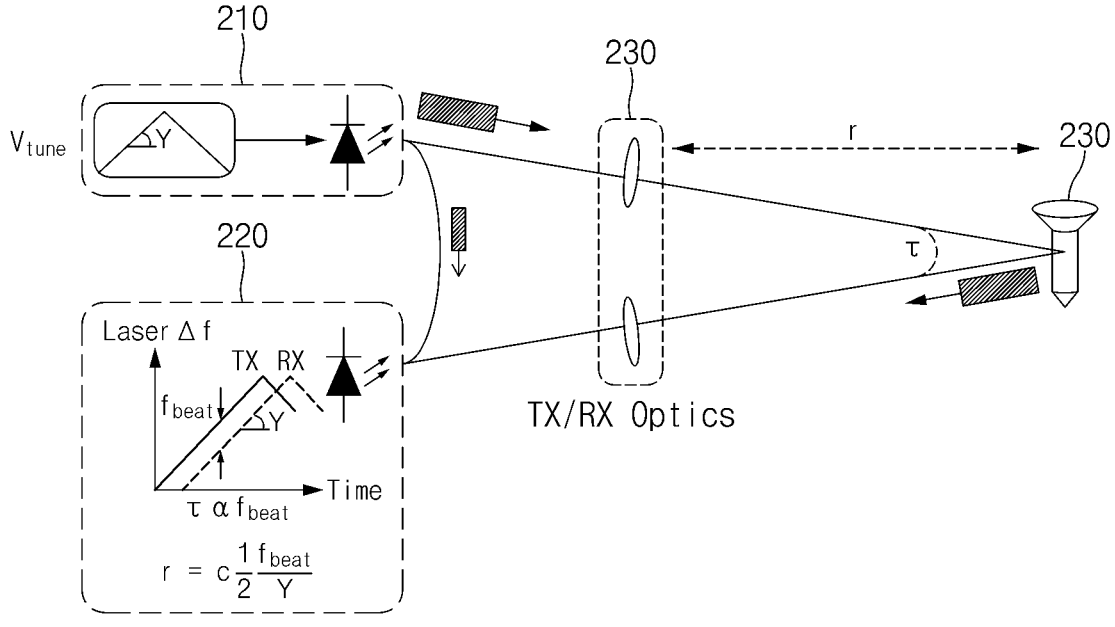
FIG. 3 illustrates a view for describing a frequency modulated continuous wave (FMCW) method of a distance detecting apparatus according to various exemplary embodiments of the present disclosure.

FIG. 3 illustrates a view for describing a frequency modulated continuous wave (FMCW) method of a distance detecting apparatus according to various exemplary embodiments of the present disclosure.

The frequency modulated continuous wave (FMCW) method is a technique that continuously changes a frequency depending on time, and has a robust characteristic against various noises. The present FMCW method basically needs to be able to continuously change a frequency (or wavelength) of a light source within a certain range. That is, as illustrated in FIG. 3, in the FMCW distance detecting system, a transmission optical signal TX radiated from a light source 210 to the outside through an optical system 230 is a signal of increasing frequency continuously on a time axis. A reception optical signal RX, which is reflected and returned after the transmission optical signal collides with a target 240, is transmitted to a sensor 220 through the optical system 230, and is delayed by a certain amount of time on the time axis, and the sensor 220 may obtain distance information by determining a frequency difference ($f_{beat}$, between the transmitted optical signal and the received optical signal at a specific time point.

Figure 4:
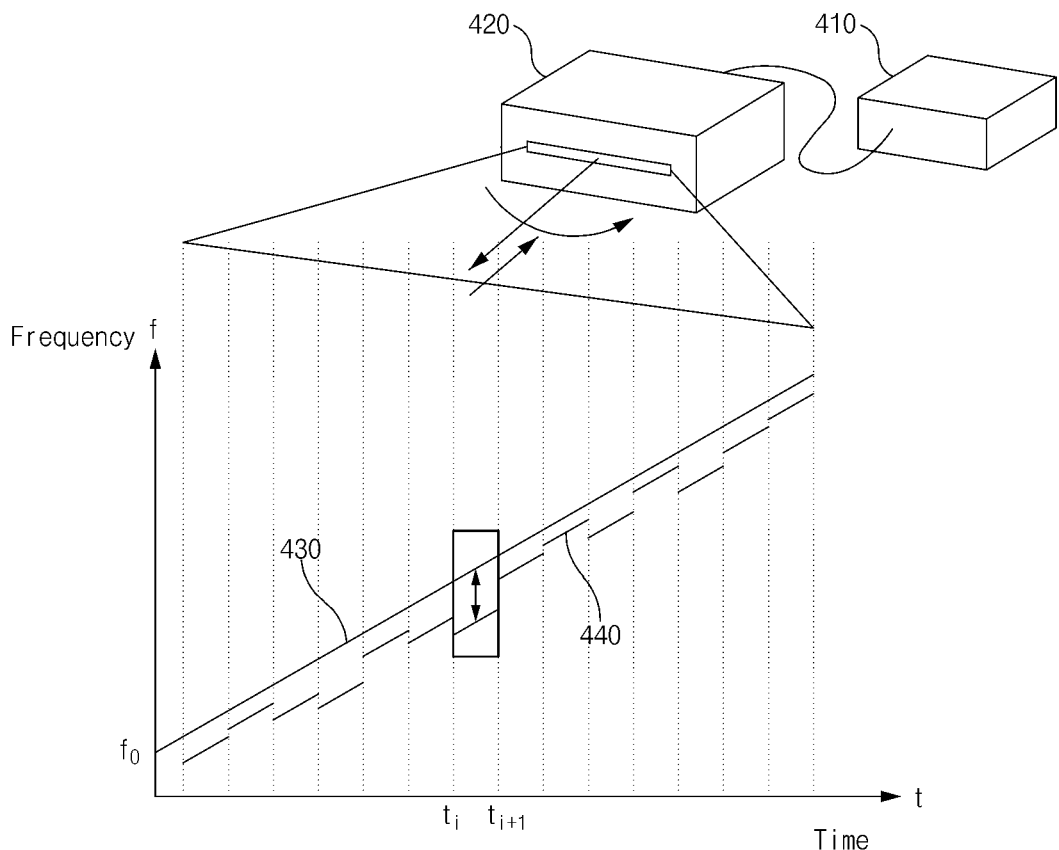
FIG. 4 illustrates a view for describing a non-mechanical scanning method of a distance detecting apparatus according to various exemplary embodiments of the present disclosure.

FIG. 4 illustrates a view for describing a non-mechanical scanning method of a distance detecting apparatus according to various exemplary embodiments of the present disclosure.

In the distance detecting apparatus, in addition to the above-described dual wavelength tuning optical signal, another important technique is a scanning technique to secure a detecting range. In the case of a simple range finder, it is necessary to transmit and receive an optical signal based on only one point, but in the case of a sensor such as a Light Detection and Ranging (LiDAR), it is necessary to detect a widest possible range. Accordingly, a method of periodically scanning an optical signal using a rotating mirror combined with a motor is being used, such a mechanical method is highly affected by vibration and has weak durability, and in an exemplary embodiment of the present disclosure, a non-mechanical scanning method is applied.

Among non-mechanical scanning methods, there is a method using a principle that a refractive index varies depending on the wavelength of the optical signal.

Light incident on a mirror patterned with diffraction lattice has a characteristic that a reflected angle varies depending on a wavelength, and by use of this, a light transmission angle may be changed without mechanical movement.

Furthermore, in the instant case, the wavelength of the incident light must be continuously changed, which is the same as a continuous wavelength changing technique of a laser required in a distance detecting technique of the FMCW method. Accordingly, it is possible to simultaneously apply the laser wavelength changing technique to non-mechanical scanning and FMCW distance detection.

Referring to FIG. 4, a light source 410 is a light source that continuously changes a wavelength (frequency), and a wavelength dispersion module 420 is configured as a scanner that adjusts a radiation angle using a diffraction gap, a lens, etc.

Emitted light is scanned from one position to another position in space while continuously changing a wavelength thereof. FIG. 4 illustrates a change in an outgoing beam 430 and a change in a reflected beam 440 when an outgoing optical signal is reflected back to a specific object (target). In the instant case, a difference in wavelength between the outgoing beam 430 and the reflected beam 440 occurs depending on a distance from an object positioned in each section in space. Accordingly, the distance detecting system of the FMCW method detects the distance by use of the difference in wavelength.

Figure 5A:
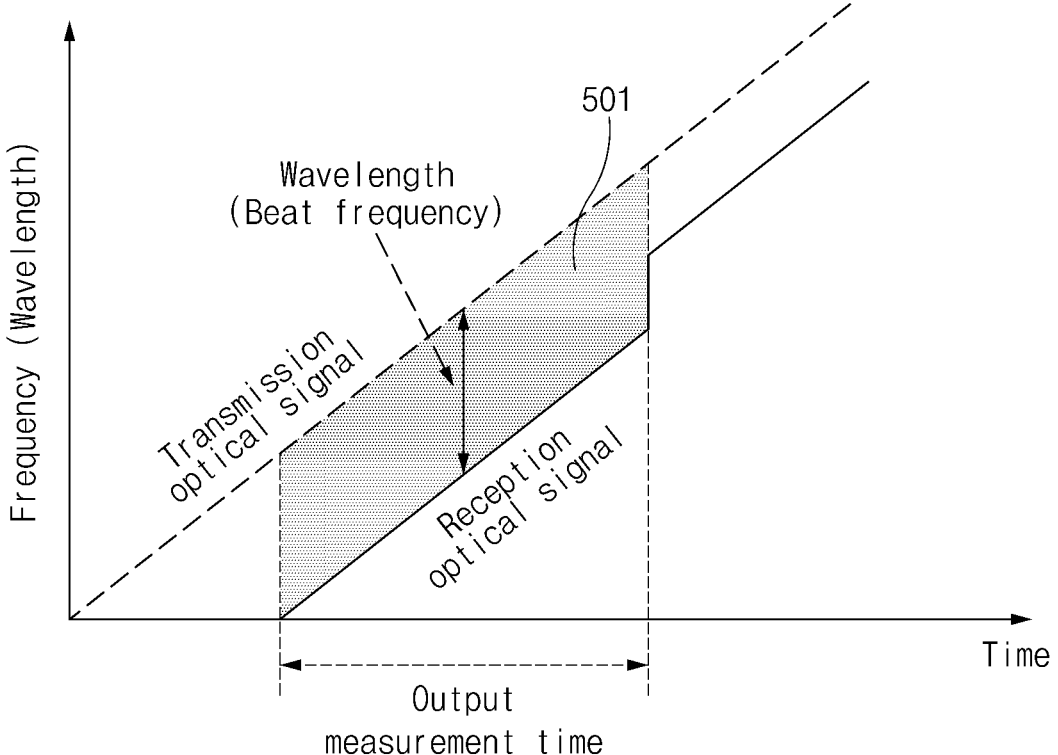
FIG. 5A and FIG. 5B each illustrate a view for describing a change in a wavelength depending on a direction movement during distance measurement of a distance detecting apparatus according to various exemplary embodiments of the present disclosure.
Figure 5B:
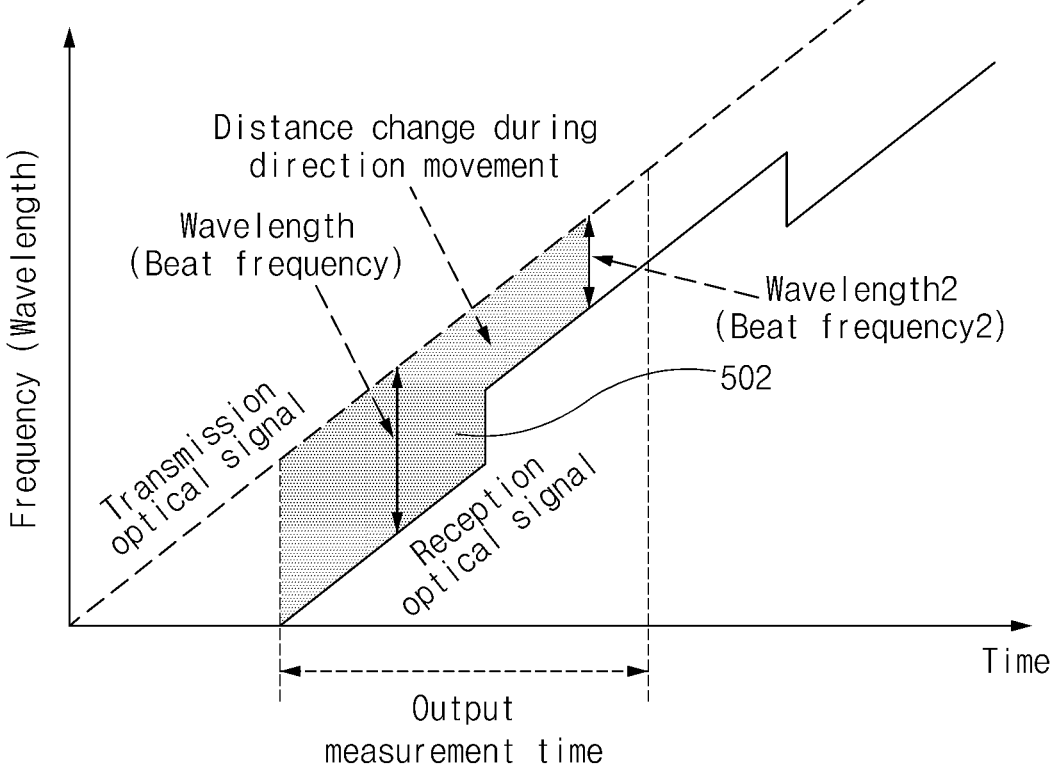

FIG. 5A and FIG. 5B each illustrate a view for describing a change in a wavelength depending on a direction movement during distance measurement of a distance detecting apparatus according to various exemplary embodiments of the present disclosure.

When scanning is performed while transmitting and receiving an optical signal in the FMCW method, a position at which light is transmitted and a position at which the light is received may be different, and thus an error may occur in detecting the distance. To be more specific, the FMCW distance detecting method is to detect a wavelength difference with a received signal returning after continuously changing the wavelength of light for a certain time period at a fixed point as shown in FIG. 5A and emitting it, and when the target is also fixed, it will have a constant wavelength difference during a time the wavelength changes (501). In the instant case, there is no problem in accurately extracting a distance to the target.

However, as illustrated in FIG. 5B, when continuously changing the wavelength of light is applied simultaneously to scanning, the point direction is moved while the wavelength is changing, so it may happen that the target changes and the wavelength difference changes. In the instant case, in measuring a distance (wavelength difference 1) of an original target, the distance (wavelength difference 2) of the target positioned at the moved point interferes, making it difficult to extract an accurate distance value. Accordingly, a result value of a boundary point where the distance is changed may become ambiguous.

That is, such a problem may occur because a scanning function for moving a point and a function for detecting an accurate distance from each point are simultaneously implemented using a single wavelength tuning light source. That is, FMCW distance detection has to detect the distance from a single point that does not move by changing a wavelength for a certain time period, but because a scanning operation is performed at the same time, there is inevitably a problem that the point moves. Furthermore, the larger the wavelength variable range required for scanning is, the more advantageous it is to secure a wide angle of view, but the wavelength variable range required for FMCW distance detection is rather small and finely adjustable, the more advantageous it may be. Accordingly, satisfying both of these characteristics is in a relationship which is in conflict with each other, and in an exemplary embodiment of the present disclosure, it is driven as follows to satisfy both of these characteristics.

That is, in a dual wavelength tuning source, an optical transmission direction is moved by one point like a general wavelength tuning method, and FMCW distance detection is performed by fine electrical wavelength tunability while it stops at the moved point. Thereafter, the optical transmission direction is moved by one point in the general wavelength tuning method, and the FMCW distance detection is performed by the fine electrical wavelength tunability in a stopped state again. Accordingly, by repeating these operations, the FMCW distance detection may be performed in an entire scan range.

This process will be described in more detail below with reference to FIG. 6.

Figure 6:
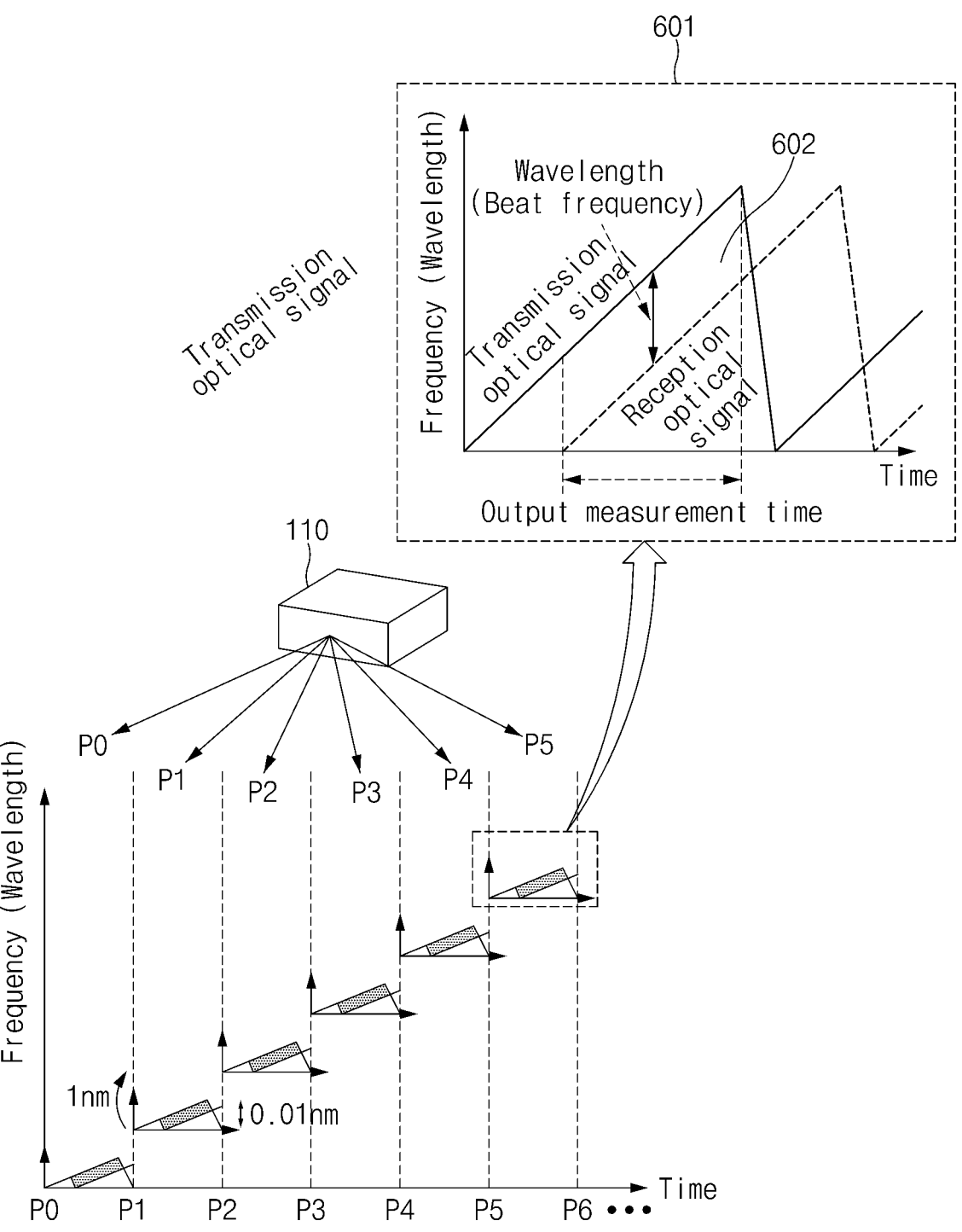
FIG. 6 illustrates a view for describing non-mechanical scanning and FMCW distance detecting operations of a distance detecting apparatus according to various exemplary embodiments of the present disclosure.

FIG. 6 illustrates a view for describing non-mechanical scanning and FMCW distance detecting operations of a distance detecting apparatus according to various exemplary embodiments of the present disclosure.

A wavelength tuning method of a light source may include a 'band tuning' function that can tune a wavelength of the light source in a wide range of several tens of nm or more, and a 'fine tuning' function that can finely tune the wavelength of the light source in units of several pm or less.

The band tuning function is necessary to realize a wide angle of view in non-mechanical scanning by securing a wide wavelength tuning range, and may include a wide variety of methods, such as a vertical-cavity surface-emitting laser (VCSEL), which is a laser emitting it in a direction which is perpendicular to an upper surface using a diffraction grating mirror or a MEMS technique.

The fine tuning function is required for FMCW distance detection, and because it utilizes only a relatively much smaller range of wavelength changes, distance detecting may be implemented with minimal impact on non-mechanical scanning. For fine tunability, a fine tuning method using an electrical signal such as an 'electrical optical modulator' may be applied.

For example, for band tunability, in non-mechanical scanning, points are discretely moved while changing the wavelength by 0.1 nm, and FMCW distance detection is performed based on a total variable range of 1 pm through fine tunability at each point. That is, since a moving interval of scanning points is 0.1 nm, while a wavelength range which is varied for FMCW at each point is only 1 pm, so a change in the scanning points may be reduced to $\frac{1}{100}$ level compared to an existing one.

As a result, in an exemplary embodiment of the present disclosure, an interference error between FMCW distance detection and non-mechanical scanning may be minimized by controlling the wavelength tuning method of the laser source in two ways.

Furthermore, according to an exemplary embodiment of the present disclosure, a wavelength difference (Beat frequency) may be reduced by use of these two wavelength tuning methods, alleviating a burden of signal processing, and when changing the wavelength for FMCW distance detection, a triangular wave may be applied to cause a wavelength change at a fast speed, which is advantageous for securing linearity, by electrically controlling it.

As described above, the present disclosure alternately sequentially operates scanning point movement by wavelength band tunability and FMCW distance detecting function by fine tunability.

Referring to FIG. 6, when it is fixed at a point P0 in one direction, FMCW distance detecting is performed for a predetermined time. After the distance detecting is performed, when the wavelength is band-changed to move the point to P1, the light transmission direction is also moved. In the moved direction, same FMCW distance detection is performed, and then operates while moving it to P2, P3 . . . . continuously.

Taking a numerical example as an exemplary embodiment of the present disclosure, first, a laser with a wavelength of 1500 nm is transmitted at a point P0, and in the instant case, when a wavelength tuning range of for FMCW is 0.01 nm, the wavelength is continuously tuned by 1500 nm to 1500.01 nm to perform the FMCW distance detection. Next, it moves to the P1 point, and when an interval of a shifted wavelength is 1 nm, it is shifted to a wavelength of 1501 nm. Even at the wavelength of 1501 nm, the FMCW distance detection is performed by changing the wavelength of 0.01 nm, and then it is moved to the wavelength of 1502 nm again. In the present operation, when a total band tuning range is 100 nm, FMCW distance detection may be performed while moving 100 points up to 1600 nm.

As a result, the wavelength range required for FMCW distance detection may be as small as $\frac{1}{100}$ or less compared to the wavelength tuning interval required for scanning, and thus position movement due to FMCW distance detection may be minimized.

Figure 7:
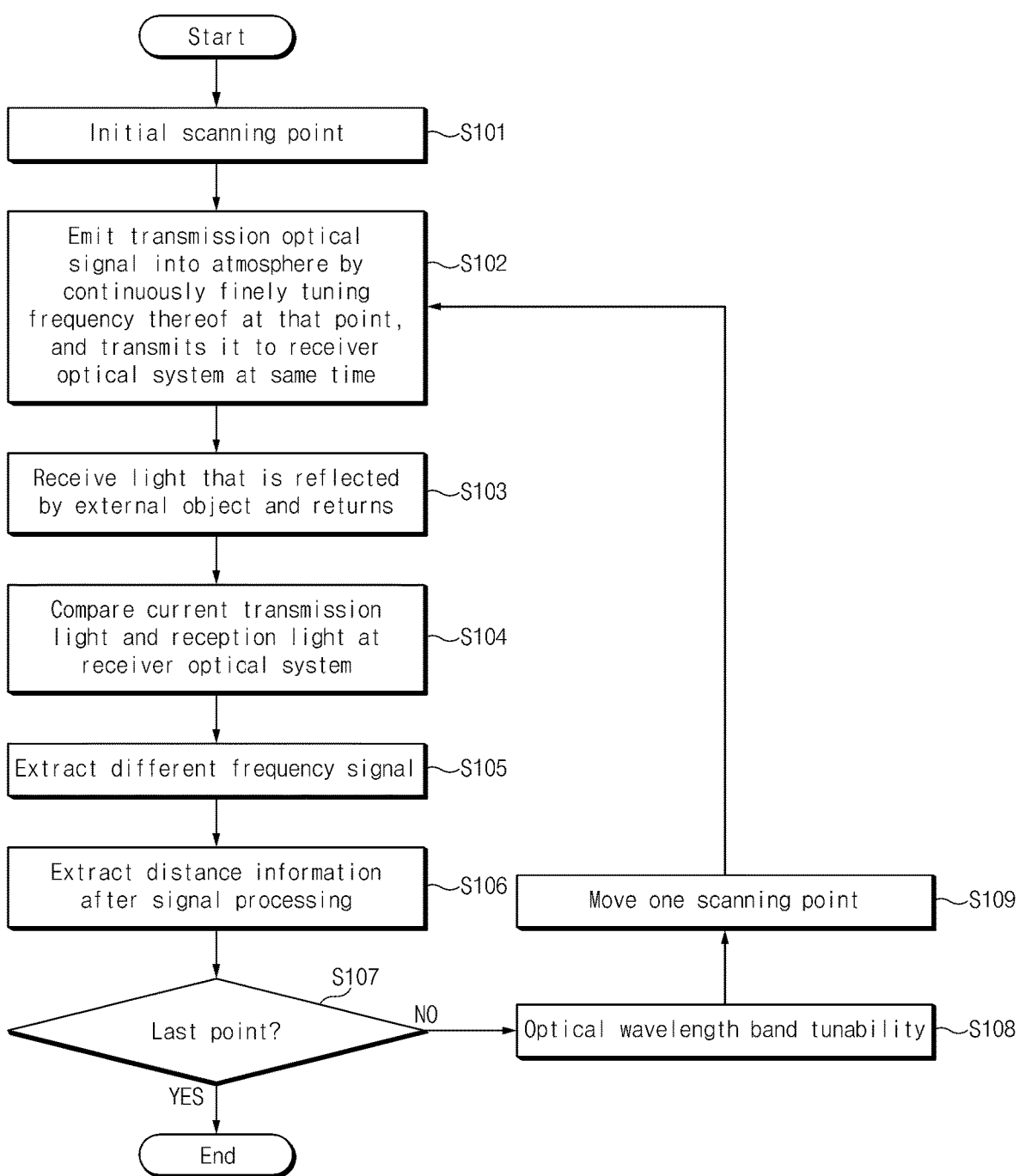
FIG. 7 illustrates a flowchart showing a distance detecting method according to various exemplary embodiments of the present disclosure.

Hereinafter, a distance detecting method according to various exemplary embodiments of the present disclosure will be described in detail with reference to FIG. 7. FIG. 7 illustrates a flowchart showing a distance detecting method according to various exemplary embodiments of the present disclosure.

Hereinafter, it is assumed that the distance detecting apparatus 100 of FIG. 1 performs a process of FIG. 7. Furthermore, in the description of FIG. 7, operations referred to as being performed by a device may be understood as being controlled by the dual wavelength tuning laser 110 and the FMCW optical system 130 of the distance detecting apparatus 100.

Referring to FIG. 7, the distance detecting apparatus 100 sets an initial scanning point (S101), emits a transmission optical signal into the atmosphere by continuously finely tuning a frequency thereof at that point, and transmits it to the receiver optical system (FMCW optical system 130) at the same time (S102).

Accordingly, the distance detecting apparatus 100 receives a reception optical signal which is reflected by an external object (e.g., target) and returns (S103), compares a transmission optical signal with the reception optical signal in the receiver optical system (FMCW optical system 130) (S104), and extracts a difference frequency (wavelength difference) between the transmission optical signal and the reception optical signal (S105).

The distance detecting apparatus 100 extracts distance information by signal processing a difference frequency (S106).

The distance detecting apparatus 100 determines whether a current point is a last point (S107), and when it is not the last point, through optical wavelength band tunability (S108), moves one scanning point (S109), and repeatedly performs the above steps S102 to S109.

Accordingly, for the distance detecting apparatus 100 of the present disclosure, the dual wavelength tuning optical laser 110 moves an optical transmission direction by one point using general wavelength tunability, and performs FMCW distance detection using fine electrical wavelength tunability while stopped at the moved point. Thereafter, the dual wavelength tuning optical laser 110 moves the optical transmission direction by one point using the general wavelength tunability, and performs the FMCW distance detection by the fine electrical wavelength tunability in a stopped state again. FMCW distance detection of the entire scan range may be performed by repeating the present process.

Figure 8:
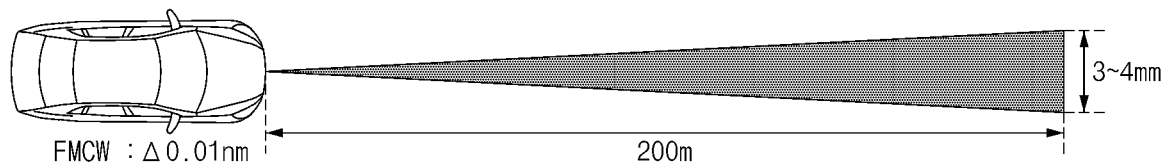
FIG. 8 illustrates a view for describing an example of determining an update expected time a change in a horizontal distance by scanning according to various exemplary embodiments of the present disclosure.

FIG. 8 illustrates a view for describing an example of determining an update expected time a change in a horizontal distance by scanning according to various exemplary embodiments of the present disclosure.

Referring to FIG. 8, even when the wavelength is changed by the FMCW distance detection, it may be seen that the scanning position is minimally changed. That is, because the wavelength changes during the FMCW distance detection, there is a possibility that optical transmission and reception positions may be different depending on a scanning optical system, but when the dual wavelength tunability provided in an exemplary embodiment of the present disclosure is applied, it is possible to solve the problem that the optical transmission and reception positions are changed by minimizing the wavelength change required for the FMCW distance detection.

For example, when a wavelength of 1 nm level is changed without fine tuning the FMCW distance detection during scanning by diffraction grating, proportionally, a position change of about 300 to 400 mm occurs during the FMCW distance detecting operation, and thus a possibility of problems such as a change in a detection target increases.

On the other hand, according to an exemplary embodiment of the present disclosure, when the wavelength is tuned by about 0.01 nm during the FMCW distance detection, only a position change of about 3 to 4 mm occurs at a distance of about 200 m by the scanning optical system.

Figure 9:
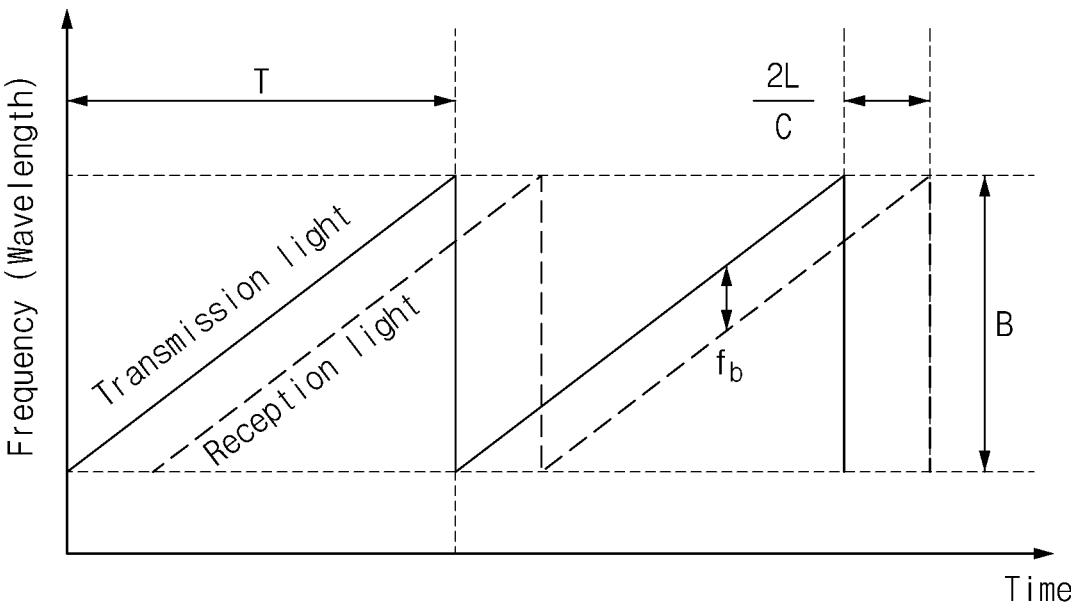
FIG. 9 illustrates a view for describing alleviation of a high frequency signal processing burden depending on a reduction in a wavelength difference according to various exemplary embodiments of the present disclosure.

FIG. 9 illustrates a view for describing alleviation of a high frequency signal processing burden depending on a reduction in a wavelength difference according to various exemplary embodiments of the present disclosure.

Referring to FIG. 9, when a dual wavelength tuning optical signal of the present disclosure is applied, the wavelength difference (Beat frequency) is reduced, reducing the high frequency signal processing burden.

That is, in the dual wavelength tunability which is differentiated in an exemplary embodiment of the present disclosure, the wavelength tunability for FMCW distance detection is a very fine range of several pm. When a wavelength tuning range is lowered in the present way, wavelength difference (Beat frequency) values of transmission and reception signals including distance information may finally be lowered. This may be confirmed by Equation 1 below, and the Beat frequency is proportional to a wavelength tuning range (B). That is, as the wavelength tuning range increases, the Beat frequency value increases, which indicates that a high frequency signal is generated.

$$\text{Beat frequency, } f_b = \frac{2L}{c} \cdot \frac{B}{T} \qquad \text{[Equation 1]}$$

L=Distance of target
c=Speed of light
B=Optical frequency scanning range
T=Scanning period An optical signal is a very fast signal in a unit of THz in a frequency domain, and thus usually, a signal of several GHz may be generated by obtaining a difference between optical transmission and reception frequencies, which is a very high-speed signal in signal conversion and processing. It is advantageous that the wavelength tuning range is lowered to lower it to several hundred MHz or less, and thus finely tuning FMCW distance detection in an exemplary embodiment of the present disclosure may be an advantage.

Figure 10A:
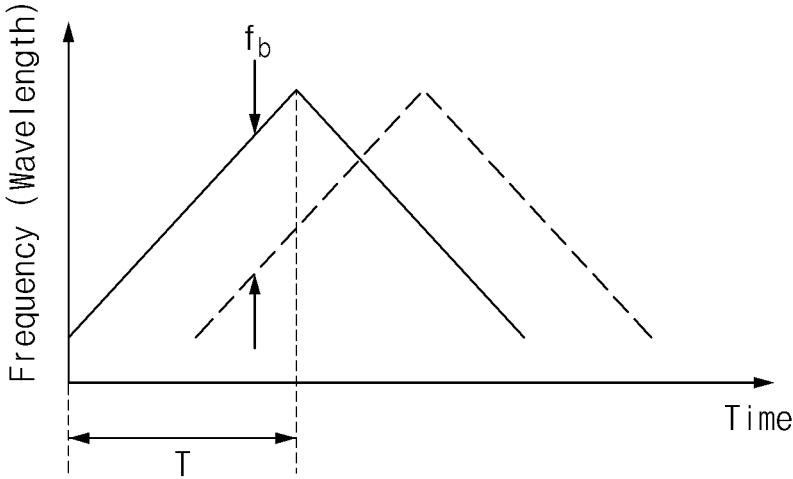
FIG. 10A and FIG. 10B each illustrate an example of triangular wave-based linear tunability when adjusting an electrical wavelength according to various exemplary embodiments of the present disclosure.
Figure 10B:
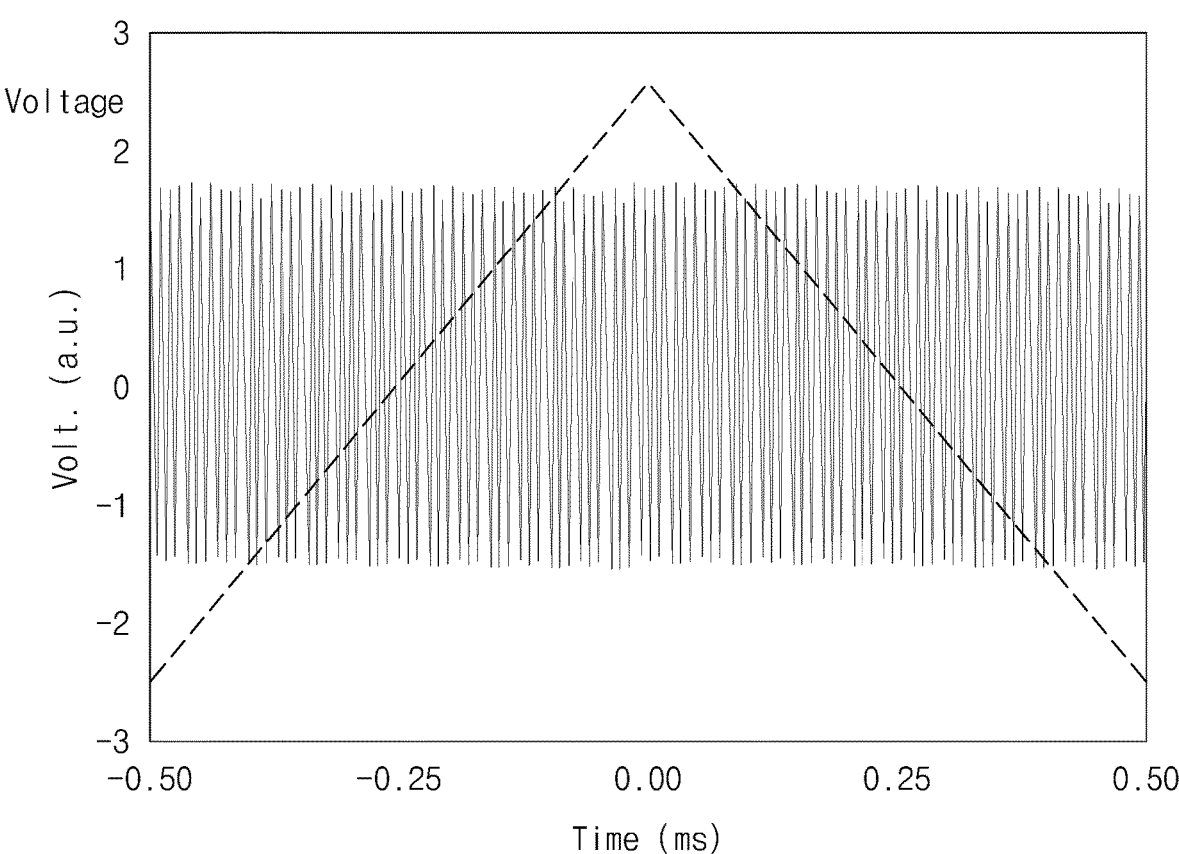
Figure 11A:
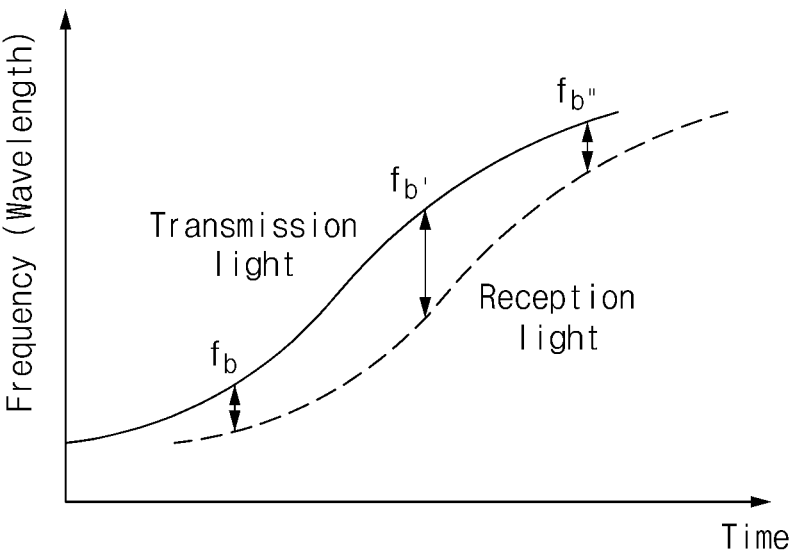
FIG. 11A and FIG. 11B each illustrate an example of sine wave-based nonlinear tunability when adjusting an electrical wavelength according to various exemplary embodiments of the present disclosure.
Figure 11B:
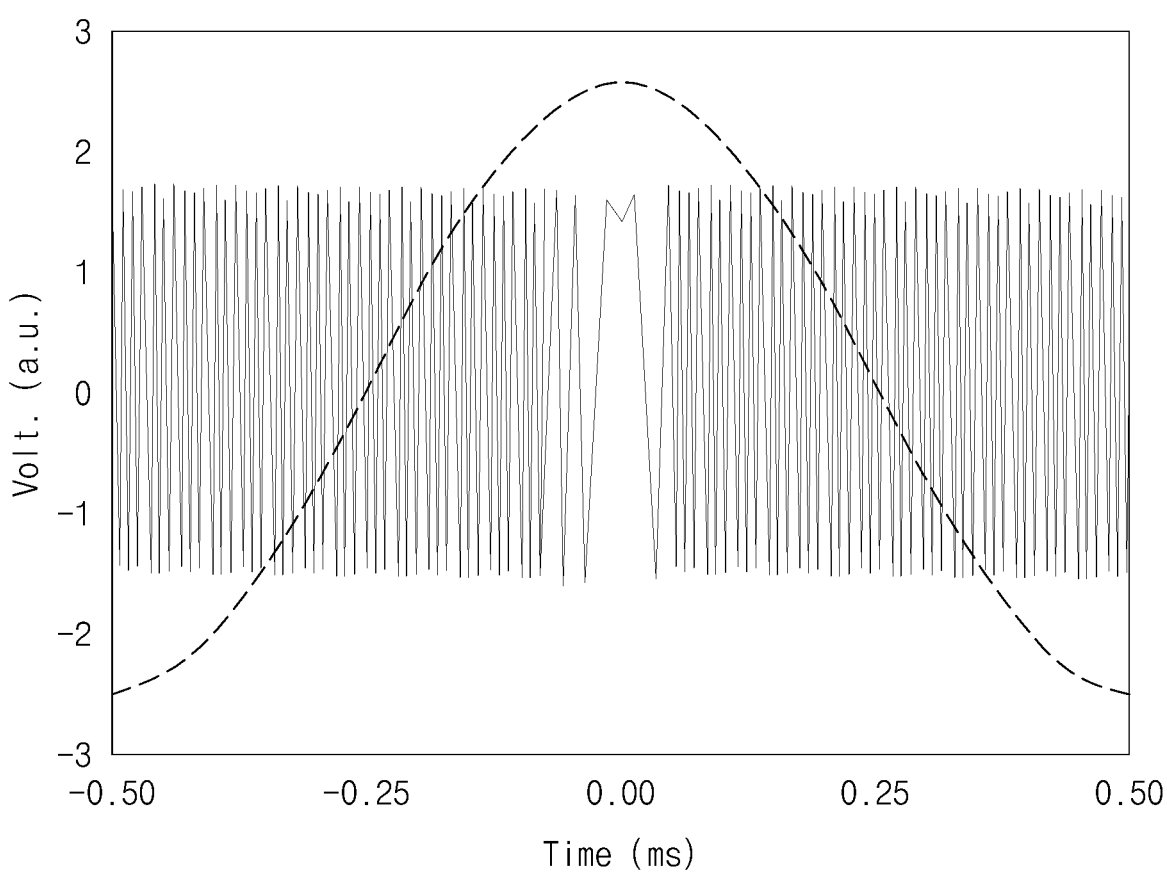

FIG. 10A and FIG. 10B each illustrate an example of triangular wave-based linear tunability when adjusting an electrical wavelength according to various exemplary embodiments of the present disclosure, and FIG. 11A and FIG. 11B each illustrate an example of sine wave-based nonlinear tunability when adjusting an electrical wavelength according to various exemplary embodiments of the present disclosure.

When changing a wavelength of a laser for FMCW distance detection, in an exemplary embodiment of the present disclosure, an electric wavelength change method was applied for a fine wavelength change.

In general, the method of using rotation of diffraction grating to change the wavelength requires mechanical movement, and thus There is no difficulty in mechanical movement when a signal that does not change rapidly, such as a sine wave, is used as a control signal. However, in the case of a sine wave, a non-linear section occurs when the wavelength is changed as illustrated in FIG. 11A, and a difference between a transmission signal and a reception signal occurs with time as illustrated in FIG. 11B. Accordingly, a separate signal processing procedure for correcting the difference is required.

On the other hand, when a wavelength tuning control signal is applied as a triangular wave (or sawtooth wave) as illustrated in FIG. 10A and FIG. 10B, because a same difference value may always be obtained according to time, a separate correction is unnecessary. However, it is not suitable for mechanical movements because there is a section of rapid signal change.

However, in the case of the fine wavelength tunability for FMCW distance detection applied in an exemplary embodiment of the present disclosure, a triangular wave or a sawtooth wave may be applied as a control signal by applying a component configured for adjusting an electrical wavelength such as an electro-optic modulator.

Figure 12:
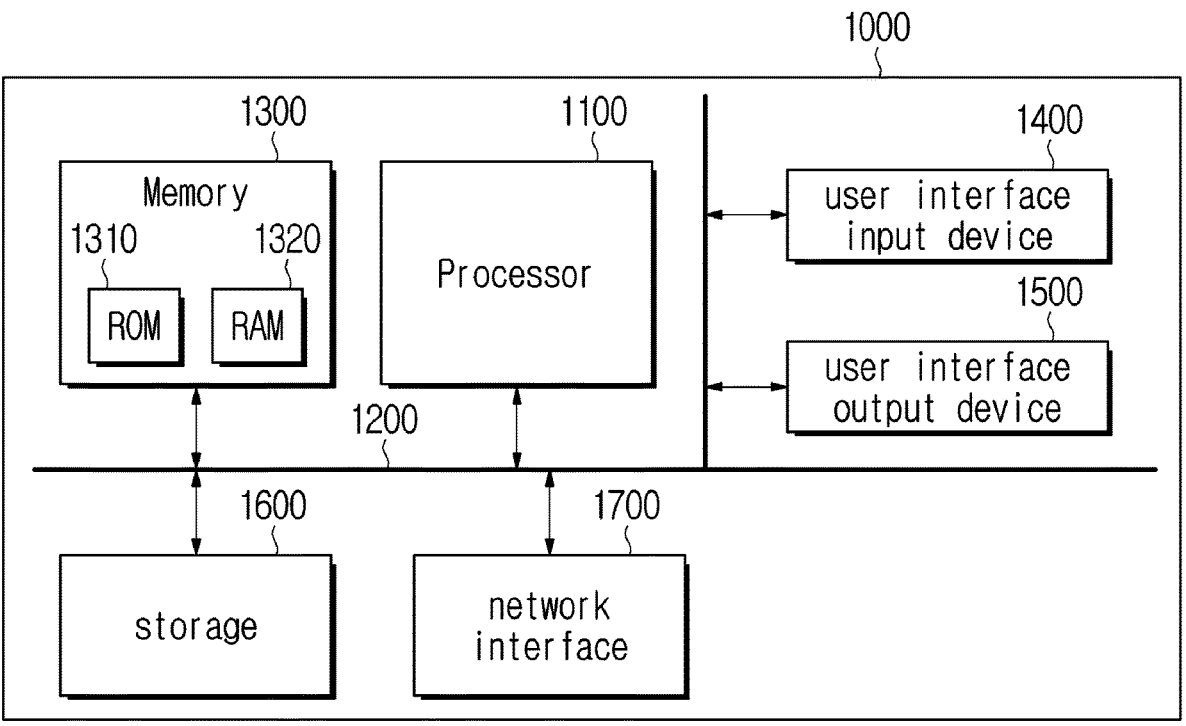
FIG. 12 illustrates a determining system according to various exemplary embodiments of the present disclosure.

FIG. 12 illustrates a determining system according to various exemplary embodiments of the present disclosure.

Referring to FIG. 12, the determining system 1000 includes at least one processor 1100 connected through a bus 1200, a memory 1300, a user interface input device 1400, a user interface output device 1500, and a storage 1600, and a network interface 1700.

The processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) 1310 and a random access memory (RAM) 1320.

Accordingly, steps of a method or algorithm described in connection with the exemplary embodiments included herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, an EPROM memory, an EEPROM memory, a register, a hard disk, a removable disk, and a CD-ROM.

An exemplary storage medium is coupled to the processor 1100, which can read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description is merely illustrative of the technical idea of the present disclosure, and those skilled in the art to which an exemplary embodiment of the present disclosure pertains may make various modifications and variations without departing from the essential characteristics of the present disclosure.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A distance detecting apparatus comprising:
a dual wavelength tuning light source configured to transmit a transmission optical signal by performing band tunability and fine tunability on an optical signal based on non-mechanical scanning;
a transmitter optical system configured to transmit the transmission optical signal received from the dual wavelength tuning light source to an outside of the transmitter optical system:
a receiver optical system configured to determine a wavelength difference between a reception optical signal received from the outside and the transmission optical signal received from the dual wavelength tuning light source; and
a signal processor configured to receive the wavelength difference from the receiver optical system and convert the wavelength difference into distance information,
wherein the dual wavelength tuning light source is configured to detect a distance by performing the band tunability for moving a band tuning transmission direction of an optical signal by one point, and performing the fine tunability for finely tuning the optical signal in a stopped state at each moved point.

2. The distance detection apparatus of claim 1, wherein the dual wavelength tuning light source includes:
an optical amplification stage configured to amplify the optical signal;
a fine tuning stage configured to electrically finely tune a wavelength of the optical signal; and
a band tuning stage configured to tune the wavelength of the optical signal at an interval that greater than a predetermined magnitude.

3. The distance detecting apparatus of claim 1, wherein the transmitter optical system includes a non-mechanical scanning optical system.

4. The distance detecting apparatus of claim 1, wherein the receiver optical system includes a frequency modulated continuous wave (FMCW) optical system.

5. The distance detecting apparatus of claim 1, wherein the dual wavelength tuning light source is configured to emit the optical signal by continuously finely tuning a frequency thereof at an initial scanning point, and to transmit the finely tuned optical signal to the receiver optical system.

6. The distance detecting apparatus of claim 5, wherein the receiver optical system is configured to receive the transmission optical signal which is reflected by an external target and returns.

7. The distance detecting apparatus of claim 1, wherein the dual wavelength tuning light source after the conversion into the distance information, is configured to determine whether a current point is a last point.

8. The distance detecting apparatus of claim 7, wherein the dual wavelength tuning light source is configured to move one scanning point in a transmission direction of the optical signal from the current point through the band tunability when the current point is not the last point.

9. The distance detecting apparatus of claim 8, wherein the dual wavelength tuning light source is configured to perform the fine tunability on the optical signal at the moved point to transmit the optical signal to the receiver optical system.

10. The distance detecting apparatus of claim 1, wherein the receiver optical system is configured to determine the wavelength difference by allowing the transmission optical signal and the reception optical signal to interfere with each other.

11. The distance detecting apparatus of claim 10, wherein the receiver optical system allows the transmission optical signal and the reception optical signal to interfere with each other by use of at least one of an optical fiber, an optical coupler, or a reflective mirror.

12. A distance detecting method comprising:
performing band tunability and fine tunability on an optical signal based on non-mechanical scanning;
transmitting a transmission optical signal which is subjected to the band tunability and the fine tunability;
receiving the transmission optical signal which is reflected by an external target and returns; and
obtaining distance information by determining a wavelength difference between the reception optical signal and the transmission optical signal,
wherein the performing of the band tunability and the fine tunability on the optical signal includes detecting a distance by moving a band tuning transmission direction of an optical signal by one point, and finely tuning the optical signal in a stopped state at the moved point.

13. The distance detection method of claim 12, wherein the transmitting of the transmission optical signal includes transmitting the transmission optical signal to an outside of a distance detecting apparatus through a non-mechanical scanning optical system of the distance detecting apparatus.

14. The distance detection method of claim 12, wherein the receiving of the signal includes receiving the signal through a frequency modulated continuous wave (FMCW) optical system.

15. The distance detection method of claim 14, wherein the performing of the band tunability and the fine tunability on the optical signal includes emitting the optical signal by continuously finely tuning a frequency thereof at an initial scanning point, and transmitting the finely tuned optical signal to the FMCW optical system.

16. The distance detection method of claim 14, wherein the obtaining of the distance information includes:
determining the wavelength difference by allowing the transmission optical signal and the reception optical signal to interfere with each other; and
converting the wavelength difference into the distance information.

17. The distance detection method of claim 12, further including:
after obtaining the distance information, determining whether a current point is a last point.

18. The distance detection method of claim 17, further including:
moving one scanning point in a transmission direction of the optical signal from the current point through the band tunability when the current point is not the last point.

* * * * *